July 7, 1964 T. R. CARTWRIGHT 3,140,386
ELECTRODE HOLDER
Filed Sept. 7, 1961
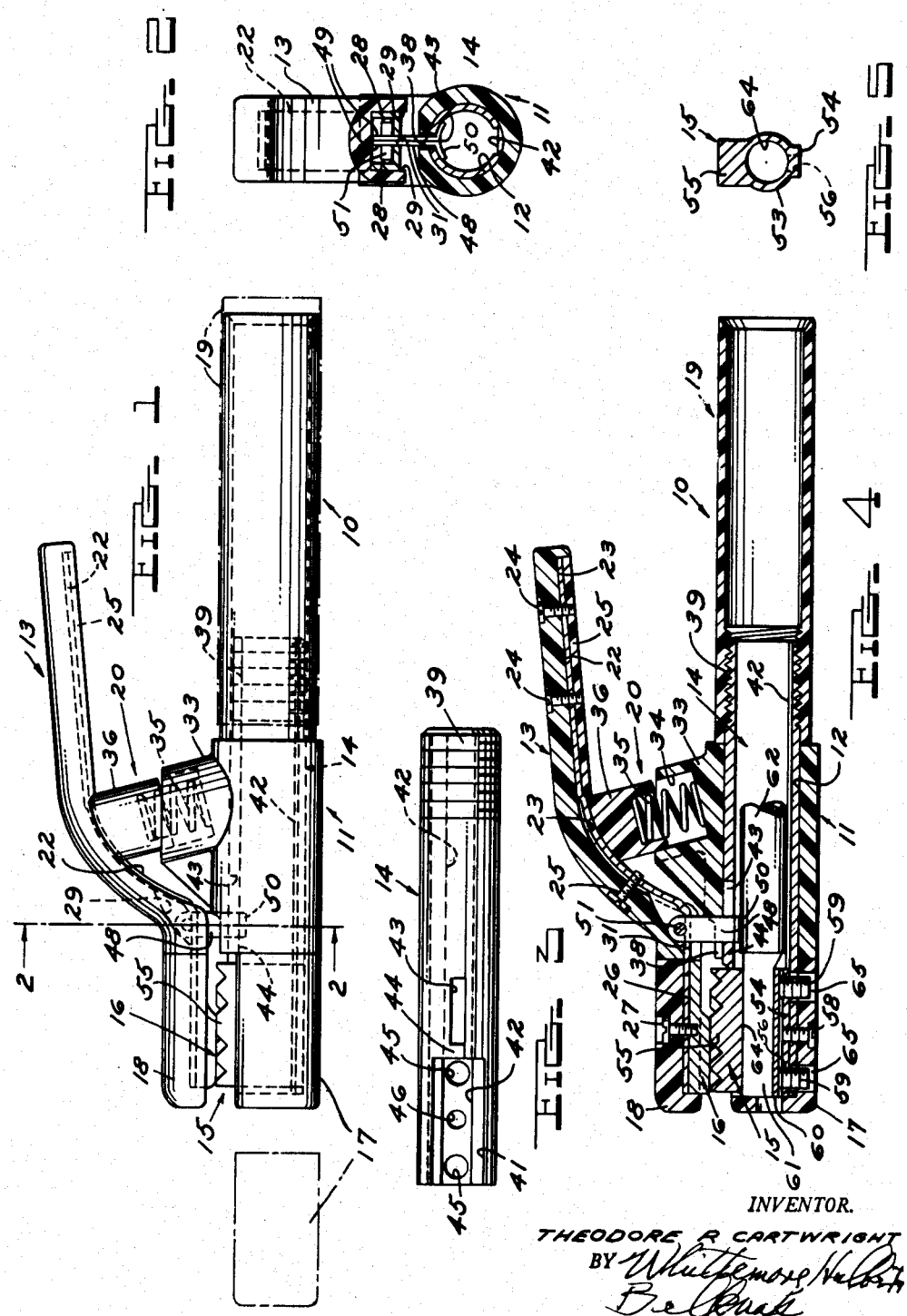
INVENTOR.
THEODORE R CARTWRIGHT
BY
ATTORNEYS United States Patent Office 3,140,386
Patented July 7, 1964

3,140,386
ELECTRODE HOLDER
Theodore R. Cartwright, St. Clair, Mich., assignor to Jerome M. Donnelly, Detroit, Mich.
Filed Sept. 7, 1961, Ser. No. 136,493
8 Claims. (Cl. 219—138)

The present invention relates to improvements in a holder for the electrodes employed in electric arc welding.

Electrode holders previously proposed and employed have had various objectionable features in point of being of excessive weight and quite cumbersome and fatiguing to manipulate, as well as subjecting the hand of the welder to a considerable degree of heat. This arose from the transmission of radiant heat from the electrical cable, rearwardly of its point of connection to one of the usual holder jaws, and conductive heat through the handle or grip means of the holder to the welder's hand. Various measures have been taken to counteract this, but regardless of the nature thereof, the holder has remained a relatively weighty one, as well as, in most instances, one featuring a number of parts contributing to excessive bulk.

Furthermore, previously proposed electrode holders have been subject to the objection that the assembly of the parts thereof is such as to considerably complicate manufacturing and, furthermore, considerably increase the time and effort of disassembly of certain components, for example for the removal and replacement of electrode holding jaws upon heat erosion thereof.

It is therefore a general object of the invention to provide an electrode holder which, as compared with previously and presently employed holders, is compact in size and exceedingly light in weight, greatly facilitating its use and to this extent increasing a welder's output.

Another object is to provide an improved electrode holder having improved provisions for bringing the electric cable well into the body of one of the grip members of the holder, with the insulation of the cable extending fully forwardly to the zone at which the insulation is stripped and the exposed cable conductively clamped to one of the electrode holding jaws. In this respect, the full length character of the cable insulation throughout the body grip member, which is tubular to axially receive the cable, eliminates objectionable heating of the holder in the zone at which it is gripped by the welder and, moreover, the arrangement is effected by the improved provisions which minimize flexure tending to wear the cable in the length thereof telescoped in the tubular grip member.

More specifically in this respect, the present improvement involves the use of an elongated tubular cable-receiving sleeve which is, in accordance with one aspect of the invention, in the form of an aluminum extrusion for lightness in weight. This sleeve receives and confines the insulated portion of the cable throughout its length from its electrically conductive connection with a holder jaw rearwardly of the holder body proper, confining the cable against significant flexure in this zone which is apt to result in destructive wear.

Another object of the invention is to provide an electrode holder of the character described having improved provision not only to facilitate the initial assembly of components thereof, but also to provide an improved and simplified pivoting of the grip members to one another. Due to these provisions, in particular by reason of the cable sleeve referred to, the jaw parts are assembled very snugly to one another in the zone of the pivoting point thereof, yet without exerting any stress on the cable at its point of connection to a holder jaw such as would be damaging in effect.

More specifically, the invention contemplates the use of an aluminum extrusion sleeve through which the cable is protected in the manner described above, this sleeve being longitudinally and upwardly slotted adjacent its forward nose to telescopingly receive internally thereof the electrode-holding jaw in question. Rearwardly and in axial alignment with the electrode-receiving recess thus afforded, the sleeve is provided with a longitudinally elongated slot of closed outline, separated from said recess by a transverse integral bridging portion across the top of the sleeve; and the pivotal connection of the other jaw member to the tubuar sleeve-receiving jaw member, which may in the alternative be termed a body member, is made through such elongated slot. Finally, the cable-receiving sleeve is provided with an external thread, projecting rearwardly through the jaw or body member in question, to which is threadedly applied an elongate tubular grip handle of insulating material, and the cable extends rearwardly through such handle to the electrical source.

As a means for effecting the pivotal connections of the grip members as referred to above, in accordance with the invention there is provided a pivot element which, in the interest of low cost production, is in the form of a sheet metal stamping of appropriate gauge. This member is in the form of an inverted T, the upstanding leg of which is exposed upwardly through the elongated slot of the sleeve, above which it has a simple pinned connection to the opposed jaw-carrying grip. Thus, with the lower electrode jaw clamped to the stripped cable and disposed in the sleeve to extend upwardly through the forward upper recess of the latter, with the pivot member arranged in the slot as described and pivoted to the upper grip, and with the tubular insulating member threaded onto the rear of the sleeve and forwardly engaging against the rear of the pivot element, it is seen that upon threadedly taking up the sleeve its bridge forwardly of the slot is drawn tightly rearwardly against the forward portion of the pivot element. Thus, accordingly, the parts are firmly and securely assembled to one another at the pivot zone without exerting any damaging pull on the cable which might tend to disturb its electrical connection to the lower jaw. The arrangements are such as to greatly compact and minimize the weight of the holder as a whole, while still insulating the cable throughout its length in the holder, eliminating operator discomfort.

The foregoing as well as other objects will be made more apparent as this description proceeds, especially when considered in connection with the accompanying drawings, wherein:

FIG. 1 is a view of the improved electrode holder in side elevation, indicating in dot-dash line the manner in which certain components are manipulated in the assembly and disassembly of the same, cable and cable clamping provisions being omitted for simplicity;

FIG. 2 is a view in vertical section along line 2—2 of FIG. 1;

FIG. 3 is a top plan view of the cable receiving and jaw mounting sleeve featured by the invention;

FIG. 4 is a view in longitudinal vertical section through the holder, along the axis of the sleeve, showing the assembly with a cable applied thereto and ready for operation; and FIG. 5 is a view in transverse vertical section through the lower jaw of the holder.

The holder of the invention, generally designated 10, is as a whole composed of a main jaw-supporting body portion 11 of a suitable rigid molded plastic composition having a cylindrical bore 12; a rigid arcuate handle or grip member 13 similarly molded of plastic material; an elongated cylindrical sleeve 14 is preferably, in accordance with the invention, in the form of an aluminum extrusion, with which the invention is to a considerable extent concerned; a lower electrode jaw 15 forwardly carried by sleeve 12 in a manner to be described; a coacting upper jaw 16 mounted on the forward end of grip 13; removable rigid, molded plastic nose elements 17, 18, respectively carried by sleeve 12 forwardly of body member 11, and by grip member 13 forwardly of the latter, these pieces encasing the respective electrode jaws 15, 16; and a grip handle extension 19 mounted on the rear of sleeve 14 and functioning in a manner to be described. A spring unit 20 acts between body and grip members 11, 13 to spread the latter in a more or less conventional manner.

The grip or handle member 13 is reinforced by an arcuate sheet metal stamping 22 received from beneath in a central groove 23 molded in the plastic material of member 13. Screws 24 secure stamping 22 to grip 13, being threaded into a plastic filler piece 25 contoured to seat the rear of slot 23; and a further screw 25 threadedly engages the stamping in the zone of its arcuate contour for the same purpose. Forwardly of this zone, the stamping 22 is bent to extend horizontally at 26 past grip member 13; and a screw 27 extends through plastic nose element 18 and an aperture in portion 26, threadedly engaging into the upper electrode holding jaw 16 to secure the same to the upper grip structure. Nose element 18 and upper jaw 16 have a dovetail-like longitudinally sliding engagement with one another, in a manner known to the art, for the removal or replacement of jaw 16.

As illustrated in FIGS. 2 and 4, the stamping 22 is, at the junction of its arcuate portion and its forward horizontal extension 26, provided with integral, parallel, upwardly extending flanges 28, making it of channel cross-section in this area; and these flanges are nested upwardly into a recess 29 molded into grip member 13 adjacent its forward end, such provisions being for the pivotal mounting of the remaining grip structure, as will be described.

For the same purpose, the stamping 22 is provided, directly beneath its channel portion defined by flanges 28, with an aperture 31 of substantial size for the free reception of the pivoting element to be described.

The main molded body grip portion 11 is formed to provide an integral upwardly extending boss 33, recessed at 34 to receive a coil compression spring 35 which seats upwardly into a molded inverted cup 36 of plastic material; and this cup abuts upwardly against the stamping 22, centrally of grip member 13. As will be appreciated by those skilled in the art, all of the rigid plastic parts thus far described will be electrically and thermally insulating in character. As illustrated in FIGS. 2 and 3, the tubular molded body member 11 is formed to provide a slot 38 in the top thereof opening through its forward end, for a purpose to be described.

Referring to FIGS. 2, 3 and 4, the extruded aluminum sleeve 14 is of a length substantially in excess of the axial length of body member 11, so that with the parts of holder 10 fully assembled, as illustrated in FIG. 4, sleeve 14 extends substantially forwardly of member 11, as well as rearwardly thereof, at which rear end the sleeve is externally threaded at 39 for the removable reception of the rigid handle piece 19, which is preferably fabricated of molded Bakelite or like rigid, insulating material.

Sleeve 14 is molded at its upper lefthand end, as viewed in FIG. 3, to provide an elongated recess 41 extending through the wall thereof and opening forwardly of its end. The recess is less than 180° in arcuate extent, so that the sleeve in this end portion is of a cross-section to slidably receive the lower jaw 15 (shown in cross-section in FIG. 5) in a dovetail fashion, enabling sliding removal of the jaw, once the nose element 17 is removed, along with the attached bared cable end, for removal and replacement of the jaw. Along its bottom longitudinal zone, the sleeve 14 is extruded in a manner to provide a groove 42 throughout the length thereof for mating and sliding engagement with the jaw 15, as the latter is shown in FIG. 5.

Again referring to FIGS. 2 and 3, the sleeve is provided with a relatively elongated molded slot 43 spaced rearwardly somewhat from the rear end of recess 41 and in axial alignment with the latter. Thus, there is provided an integral transverse bridge portion 44 between recess 41 and slot 43 for a purpose to be described. As shown in FIG. 3, the slot 43 is, when the parts are finally assembled, in general vertical alignment with the aperture 31 of upper grip stamping 22 and with the forward slot 38 of lower grip body member 11. Finally, the sleeve 14 is, directly beneath its forward upper recess 41 and in the zone of its bottom groove 42, provided with longitudinally aligned and spaced openings 45 and 46 for the reception of certain securing and clamping screws, to be described.

The holder is completed by a pivoting member 48 of the sort best shown in FIGS. 2 and 4 of the drawings. It is of stamped sheet metal, bent upon itself to provide a pair of integral legs 49 in flat-wise engagement with one another; which legs terminate downwardly in oppositely outwardly extending flanges 50 (FIG. 2) so that the pivot member 48 is of inverted T-shaped outline. It is inserted from the interior of sleeve 14 upwardly through the elongated slot 43 of the sleeve, thence through the aperture 31 of stamping 22, where it is pivoted between the flanges 28 of the latter by means of a pivot pin 51.

Thus, the assembly of the grip members 11, 13 to one another through the agency of sleeve 14 is an extremely simple one, yet very effective for the intended purposes of the holder 10, as will appear. To disassemble, it is only necessary to free grip member 13 from the stamping by releasing screws 24, 25, thus exposing pivot pin 51 for removal to enable the grip members to be separated. Assembly is, of course, in a reverse sequence, and equally simple and expeditious.

Referring to FIG. 5, the lower jaw 15 is generally circular in its lower body portion 53, but is provided with an internal lower rib extension 54 to slidingly mate with the sleeve groove 42. The jaw is of restricted width and vertical walled shape at 55, such as to be slidingly received with slight clearance between the spaced walls of the forward sleeve recess 41, and the height of this portion is, as appears in FIGS. 1 and 4, sufficient to bring it well above the top of sleeve 14 for coaction with the upper jaw 16 in clamping an electrode rod.

Jaw 15 is provided with upwardly extending tapped holes 56 through its thickened lower portion at rib 54. These, as illustrated in FIG. 4, threadedly receive a screw 58 extending through the central hole 46 of sleeve 14, thus to secure the jaw to the forward end of the sleeve, as well as Allen-type set screws 59. Screws 58, 59 thread upwardly through the jaw 15 for engagement with an elongated arcuate clip 60 cradling the stripped end 61 of an insulated cable 62, which extends longitudinally through the sleeve 14, with its insulation removed immediately to the rear of jaw 15. The latter has a cylindrical bore 64 receiving the stripped cable end 61 and the clip 60. Thus, with screws 58, 59 taken up, the clip 60 is tightly engaged with the cable end 61 and electrically connects the same with jaw 15. The lower molded plastic nose element 17 is provided with clearance openings 65 for the reception of the screw means just described.

As assembled in the manner illustrated in FIG. 4, upon tightening of the fibre handle 19, the lower body grip member 11 is forced forwardly of sleeve 14, bringing the rear of its upper slot 38 forwardly against the pivot member 48 extending through sleeve slot 43. This at the same time brings the integral transverse bridge 44 into firm rearward engagement with the forward portion of pivot member 48, drawing the sleeve 14 and body 11 into rigid interconnected engagement with one another to constitute, in effect, a unitary, externally insulated piece.

Yet this is done without imposing any stress whatsoever upon cable 62 or its connection to the lower jaw 15. Removal of member 15 for replacement is rendered very easy and speedy, simply involving the release of forward nose element 17 by unscrewing screw 58, as well as the release of set screws 59 to free the jaw from sleeve 14. Element 17 is then slipped off, whereupon the jaw can be withdrawn and replaced. With the cable also drawn forwardly for exposure beyond the end of the sleeve, a replacement jaw is readily assembled to cable end 61, whereupon the parts are restored and secured in place by a reverse sequence of operations.

The improved holder is exceedingly compact and light in weight, and is very efficiently insulated, both electrically and thermally, in part due to the bringing of the insulation of the cable well forwardly to the jaw 15. The cable is protected by sleeve 14 against bending such as would weaken the same. Being constructed of inexpensive materials which are easily and quickly assembled the cost of production of holder 10 is, needless to say, substantially reduced as compared with that of holders of a comparable type presently in use.

What I claim as my invention is:

1. An electrode holder comprising a tubular body member, a jaw carrying grip member for coaction with said body member in holding an electrode between jaws mounted by the members, and means pivotly connecting said members to one another, including a sleeve telescoped axially in said body member and adapted to receive an electrical cable through the sleeve bore, with said sleeve externally supportd by said body member, an electrode holding jaw forwardly and removably supported by said sleeve, to which jaw said cable is forwardly connected electrically, said sleeve having an opening extending radially through the wall thereof and spaced rearwardly from a portion of the sleeve forwardly facing said last named jaw, thus providing a bridge element integral with the sleeve between said last named portion and said sleeve opening, a pivot member operatively connected to said sleeve and extending radially through said opening, said last named member having a pivotal connection to said jaw carrying grip member rearwardly of a jaw carried by the latter, said body member forwardly abutting said pivot member radially outwardly of said sleeve and on the side of the pivot member opposite said bridge element, and means to urge said body member and sleeve in opposite axial directions to a sufficient degree to clamp said pivot member between said bridge element and body member with the latter and the sleeve in fixed relation to one another.

2. An electrode holder comprising a tubular body member, a jaw carrying grip member for coaction with said body member in holding an electrode between jaws mounted by the members, and means pivotally connecting said members to one another, including a sleeve telescoped axially in said body member and adapted to receive an electrical cable through the sleeve bore, said sleeve being provided with a radial, axially extending recess in its wall opening forwardly through an end thereof, with said sleeve externally supported by said body member, an electrode holding jaw forwardly and removably received in said sleeve at said recess thereof, to which jaw said cable is forwardly connected electrically, said sleeve having an opening extending radially through the wall thereof in the direction of said recess and spaced rearwardly from an end portion of the recess forwardly facing said last named jaw, thus providing a bridge element integral with the sleeve between said last named portion and said sleeve opening, a pivot member operatively connected to said sleeve and extending radially through said opening, said last named member having a pivotal connection to said jaw carrying grip member rearwardly of a jaw carried by the latter, said body member forwardly abutting said pivot member radially outwardly of said sleeve and on the side of the pivot member opposite said bridge element, and means to urge said body member and sleeve in opposite axial directions to a sufficient degree to clamp said pivot member between said bridge element and body member with the latter and the sleeve in fixed relation to one another.

3. An electrode holder comprising a tubular body member, a jaw carrying grip member for coaction with said body member in holding an electrode between jaws mounted by the members, and means pivotally connecting said members to one another, including a sleeve telescoped axially in said body member and adapted to receive an electrical cable through the sleeve bore, said sleeve being provided with a radial, axially extending recess in its wall opening forwardly through an end thereof, with said sleeve externally supported by said body member, an electrode holding jaw forwardly and removably received in said sleeve, to which jaw said cable is forwardly connected electrically, said sleeve having an opening extending radially through the wall thereof in the direction of said recess and spaced rearwardly from an end portion of the recess forwardly facing said last named jaw, thus providing a bridge element integral with the sleeve between said last named portion and said sleeve opening, a pivot member operatively connected to said sleeve and extending radially through said opening and anchored against radial separation from the sleeve, said last named member having a pivotal connection to said jaw carrying grip member rearwardly of a jaw carried by the latter, said body member forwardly abutting said pivot member radially outwardly of said sleeve and on the side of the pivot member opposite said bridge element, and means to urge said body member and sleeve in opposite axial directions to a sufficient degree to clamp said pivot member between said bridge element and body member with the latter and the sleeve in fixed relation to one another.

4. An electrode holder comprising a tubular body member, a jaw carrying grip member for coaction with said body member in holding an electrode between jaws mounted by the members, and means pivotally connecting said members to one another, including a sleeve telescoped axially in said body member and adapted to receive an electrical cable through the sleeve bore, said sleeve being provided with a radial, axially extending recess in its wall opening forwardly through an end thereof, with said sleeve externally supported by said body member, an electrode holding jaw forwardly and removably received in said sleeve at said recess thereof, to which jaw said cable is forwardly connected electrically, said sleeve having an axially elongated opening extending radially through the wall thereof in the direction of said recess and spaced rearwardly from an end portion of the recess forwardly facing said last named jaw, thus providing a bridge element integral with the sleeve between said last named portion and said sleeve opening, a pivot member operatively connected to said sleeve and extending radially through said opening and anchored against radial separation from the sleeve, said last named member having a pivotal connection to said jaw carrying grip member rearwardly of a jaw carried by the latter, said body member forwardly abutting said pivot member radially outwardly of said sleeve and on the side of the pivot member opposite said bridge element, and being provided with a forward slot straddling the pivot member in so abutting the latter and means to urge said body member and sleeve in opposite axial directions to a sufficient degree to clamp said pivot member between said bridge element and body member with the latter and the sleeve in fixed relation to one another.

5. An electrode holder comprising a tubular body member, a jaw carrying grip member for coaction with said body member in holding an electrode between jaws mounted by the members and means pivotally connecting said members to one another, including a sleeve telescoped axially in said body member and adapted to receive an electrical cable through the sleeve bore, said sleeve being provided with a radial, axially extending recess in its wall opening forwardly through an end thereof, with said sleeve externally supported by said body member, an electrode holding jaw forwardly and removably received in said sleeve at said recess thereof, to which jaw said cable is forwardly connected electrically, said sleeve having an axially elongated opening extending radially through the wall thereof in the direction of said recess and spaced rearwardly from an end portion of the recess forwardly facing said last named jaw, thus providing a bridge element integral with the sleeve between said last named portion and said sleeve opening, a pivot member operatively connected to said sleeve and extending radially through said opening, said last named member having a pivotal connection to said jaw carrying grip member rearwardly of a jaw carried by the latter, said body member forwardly abutting said pivot member radially outwardly of said sleeve and on the side of the pivot member opposite said bridge element, and means to urge said body member and sleeve in opposite axial directions to a sufficient degree to clamp said pivot member between said bridge element and body member with the latter and the sleeve in fixed relation to one another, comprising a tubular member threadedly connected to said sleeve rearwardly of the body member and forwardly engaging the latter.

6. An electrode holder comprising a tubular body member, a jaw carrying grip member for coaction with said body member in holding an electrode between jaws mounted by the members, and means pivotally connecting said members to one another, including a sleeve telescoped axially in said body member and adapted to receive an electrical cable through the sleeve bore, said sleeve being provided with a radial, axially extending recess in its wall opening forwardly through an end thereof, with said sleeve externally supported by said body member, an electrode holding jaw forwardly and removably received in said sleeve at said recess thereof, to which jaw said cable is forwardly connected electrically, said sleeve having an axially elongated opening extending radially through the wall thereof in the direction of said recess and spaced rearwardly from an end portion of the recess forwardly facing said last named jaw, thus providing a bridge element integral with the sleeve between said last named portion and said sleeve opening, a pivot member operatively connected to said sleeve and extending radially through said opening and anchored against radial separation from the sleeve, said last named member having a pivotal connection to said jaw carrying grip member rearwardly of a jaw carried by the latter, said body member forwardly abutting said pivot member radially outwardly of said sleeve and on the side of the pivot member opposite said bridge element, and being provided with a forward slot straddling the pivot member in so abutting the latter, and means to urge said body member and sleeve in opposite axial directions to a sufficient degree to clamp said pivot member between said bridge element and body member with the latter and the sleeve in fixed relation to one another, comprising a tubular member threadedly connected to said sleeve rearwardly of the body member and forwardly engaging the latter.

7. An electrode holder comprising a tubular body member, a jaw carrying grip member for coaction with said body member in holding an electrode between jaws mounted by the members, and means pivotally connecting said members to one another, including a sleeve telescoped axially in said body member and adapted to receive an electrical cable through the sleeve bore, with said sleeve externally supported by said body member, an electrode holding jaw forwardly and removably supported by said sleeve, to which jaw said cable is forwardly connected electrically, said sleeve having an opening extending radially through the wall thereof and spaced rearwardly from a portion of the sleeve forwardly facing said last named jaw, thus providing a bridge element integral with the sleeve between said last named portion and said sleeve opening, a pivot member pivotally associated with said sleeve and extending radially through said opening, said last named member having a pivotal connection to said jaw carrying grip member rearwardly of a jaw carried by the latter, said body member forwardly abutting said pivot member radially outwardly of said sleeve and on the side of the pivot member opposite said bridge element, and means to urge said body member and sleeve in opposite axial directions to a sufficient degree to clamp said pivot member between said bridge element and body member with the latter and the sleeve in fixed relation to one another, comprising a tubular member threadedly connected to said sleeve rearwardly of the body member and forwardly engaging the latter.

8. An electrode holder comprising a tubular body, a sleeve telescoped axially in said body and coacting with the latter in removably supporting a forward jaw, a coacting jaw carrying member, and means to pivotally connect said body and member to one another, comprising a pivot member extending radially of said sleeve and body to a pivotal connection on said jaw carrying member, said pivot member being engaged on opposite axial sides by said sleeve and body upon relative axial thrust of the same in opposite directions, thus to lock said sleeve, body and pivot member together, and means operatively connected to the sleeve and body to produce said relative axial thrust.

References Cited in the file of this patent
UNITED STATES PATENTS

| | | |
|---|---|---|
| 2,064,908 | Gruell | Dec. 22, 1936 |
| 2,174,809 | Varner | Oct. 3, 1939 |
| 2,903,568 | Wells | Sept. 8, 1959 |